Figure 2:
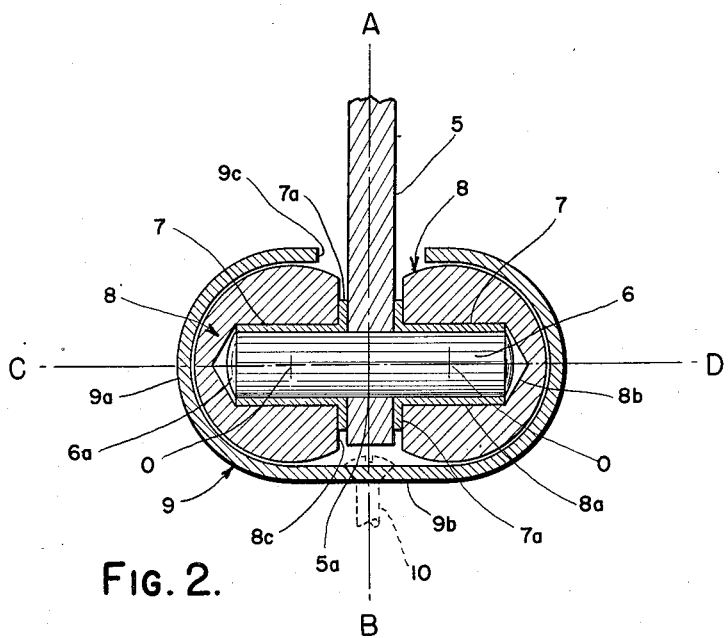

Jan. 16, 1951  N. F. SVENDSEN  2,538,434
ROLLER AND TRACK CONSTRUCTION
Filed Jan. 3, 1946

NORMAN F. SVENDSEN
*INVENTOR.*

BY *James M. Clark*
HIS PATENT ATTORNEY.

Patented Jan. 16, 1951

2,538,434

UNITED STATES PATENT OFFICE 2,538,434

ROLLER AND TRACK CONSTRUCTION

Norman F. Svendsen, Los Angeles, Calif., assignor to North American Aviation, Inc.

Application January 3, 1946, Serial No. 638,874

7 Claims. (Cl. 16—95)

1

The present invention relates to improved guide means and more particularly to a non-binding roller and track construction.

It is frequently necessary, particularly in aircraft, ships and other vehicle construction, that certain components such as windshields, cockpit canopies, turrets and similar elements be relatively movable or slidable with respect to the body structure of the vehicle. Numerous expedients have been utilized to provide friction free guide means between these relatively movable parts, the most common arrangement being the use of a wheel or roller having flat or rounded faces running within a track which frequently is of channel cross section. The various movable components referred to above, as well as the adjacent portions of the body structure upon which they are supported, are subjected to numerous forces which produce eccentric loads and cause most of these rollers to bind and jam on the top and bottom of the track. In aircraft these disturbing forces may originate in the reaction of the movable body with the airstream; distortion resulting from internal pressurization; or deflections due to expansion and contraction resulting from temperature changes; or to the absorption or release of loads from the aircraft.

An example of such conditions is the eccentric or uneven loads imposed upon sliding aircraft cockpit canopies and the tendency of the latter to bind, jam and otherwise to become inoperative under these conditions. Inasmuch as the life of a pilot may frequently depend upon his ability to open a canopy and evacuate his cockpit within a matter of a few seconds, it is highly important that guide means be utilized for such canopies which are free from any binding or jamming tendencies under any of the conditions normally met with in their operation.

The present invention is directed to an improved spherical roller and track arrangement, allowing sufficient clearance between the roller and the track to clear the upper and outer opposed portions, and which successfully eliminates the binding and other objections met with in most prior devices. It consists essentially in providing a track of C-shaped cross section having semi-circular end portions with an intermediate tangential or straight interconnecting portion, within which a pair of spherical ball rollers are co-axially mounted upon a common pivot or axle, carrying between them a plate or web, these rollers being of slightly lesser outside diameter than the inside diameter of the end portions of the C-shaped track. The relationship of the

2 outer surfaces of the ball rollers and the inner part-cylindrical surfaces of the track is such that regardless of the forces applied to the central web member each roller engages its respective track portion in substantially single point contact, which will normally be above or below the common axis of the roller pivotation and prevents binding between the movable and fixed elements. Since point contact exists at all times, the rollers will not bind on the top and bottom of the track under eccentric loads, and have operated satisfactorily under highly abnormal conditions such as have been created under excessive loads.

It is accordingly a principal object of the present invention to provide an improved roller and track construction which is relatively free of binding and jamming characteristics. It is a further object to provide an improved guide means of a type which is readily assembled and disassembled, and one which is foolproof in its operation. A further object resides in the provision of a roller and track construction in which the rollers engage the tracks in virtually single point contact. Other objects of this invention relate to the improved details and relationship of the respective parts of the roller and track construction.

Figure 1:
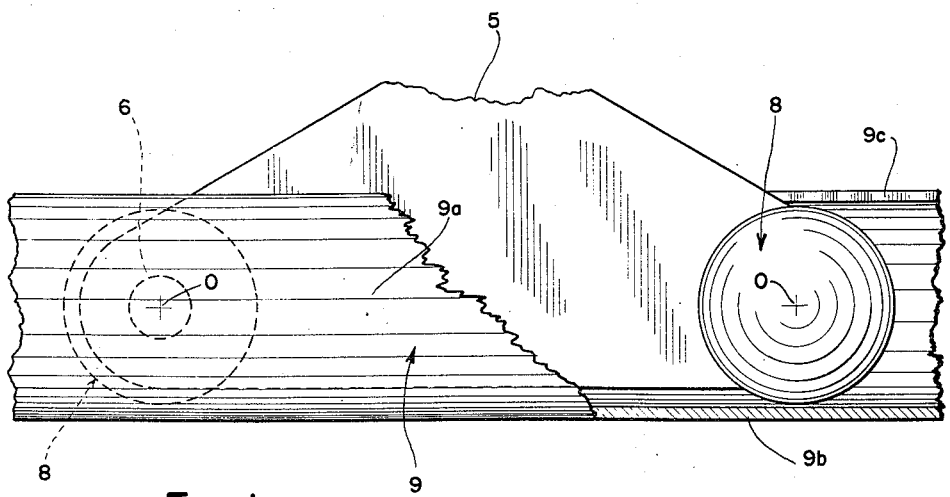

Further objects and advantages will become apparent to those skilled in the art after a reading of the present description, taken together with the accompanying drawings forming a part hereof, in which:

Fig. 1 is a side elevational view of the improved track partly broken away to show the relationship of the rollers and truck therein; and Fig. 2 is a transverse cross-sectional view of the truck and roller assembly.

Referring now to Fig. 1, the numeral 5 represents a triangular web or plate which may comprise a truck of an aircraft canopy, or similar movable component. It will be understood that a canopy or other movable component may be attached to the apex portion of the truck shown broken away. As indicated in both Figs. 1 and 2 the truck plate 5 is provided with holes or openings 5a within which may be inserted the pins or pivots 6. The latter may preferably be pressed or brazed within the holes 5a in the truck to maintain the pins in their central position, and these pins are preferably provided with rounded ends 6a.

A pair of thrust bearings 7, each comprising a cylindrical bushing portion having a bore to rotatively receive the pin 6 and flanged inner ends 7a to bear against the truck plate 5, are disposed on each side of the latter to absorb side thrust upon the rollers 8. Each of the latter rollers is provided with a suitable bore 8a to rotatively receive the outside diameter of the thrust bearing bushing 7, the ends of the bore 8a being terminated in conic portions 8b to provide clearance for the rounded ends 6a of the pin and the ends of the bearings 7. Each roller is in the form of a ball or sphere, being cut off at an inner face 8c in a plane transverse to the axis C—D of the pin 6 giving the roller a D shape in cross section. This face is at such a distance from the center O of the sphere that the thickness of the truck 5 and the collar or flange 7a will serve to place each ball roller within the track with a minimum predetermined clearance.

The track 9 is formed from a single sheet or plate of uniform thickness into two semi-circular end or side portions 9a interconnected by a straight tangential portion 9b at its lower side. Its edges 9c define an open slot through which the truck 5 may clearingly be moved in a longitudinal direction along the track. The central axis of the truck, roller and track assembly is designated by the axis A—B about which the assembly is preferably symmetrical.

As shown in Fig. 2, the part-spherical rollers 8 are indicated in their neutral or central position with respect to the guide track 9. If we assume that the truck 5 is loaded vertically such that the movable assembly is translated downwardly along the axis A—B, the lower periphery of the rollers 8 will contact the track 9 at points substantially beneath the centers O of each roller. Accordingly, since but one point of each roller is in contact with the track and these points are not oppositely and wedgingly disposed the truck will be free to slide without binding. Upward or outward movement of the truck 5 will result in contact of the rollers and track substantially above the points O with similar freely slidable qualities. In the event the movable assembly is translated laterally along the axis C—D it will be obvious that the point on the leading roller along the axis C—D will contact the adjacent inner surface of the track on one side of the assembly only. In the event that the movable assembly is translated longitudinally of the track during this condition, it will be obvious that the roller in contact with the adjacent portion of the track may slide rather than rotate due to the point of contact being on the pivotal axis of the roller. Inasmuch as but one of the two rollers of each pair will be in sliding contact under these conditions the rollers will not jam or bind. In the event, however, that non-rotation is found objectionable, it has been readily overcome by flattening the central area of the roller directly on the line of the supporting axis C—D, with the plane of the flat portion lying normal to this axis or parallel to the inner face 8c of the roller. In the event that the movable elements are rotated about the intersection of the axes A—B and C—D the upper surface of one roller and the lower surface of the opposite roller will contact the adjacent portions of the track and longitudinal movement will be readily permitted by rotation of the rollers in opposite directions. Since point contact always occurs, the rollers will not bind on top and bottom of track under eccentric loading conditions.

The track 9 should be constructed of suitable material and of adequate thickness that it maintain its form and shape without undue deflection or twisting. The track is preferably mounted upon the adjacent body structure as by the machine screws 10 indicated in dotted lines in Fig. 2 disposed along the plane of symmetry of the track and through its flat back portion of the C-shape. The rollers and attached truck are assembled within the guide track by insertion through an open end of the track the sides of which maintain each roller on its thrust bearing in its proper operative position. The ends of the track may subsequently be blocked off or closed by suitable stop members. The track may either be straight, circular or curved depending upon the individual requirements of the particular installation. The collars 7a provide thrust bearings for the rollers when they are subjected to lateral pressures and the bushing-collar assembly 7 serving as the bearing may either be of self-lubricating material or lubricated by external means.

The truck 5, as indicated in Fig. 1 is shown in a substantially triangular shape as might be used for a sliding canopy or windshield, although of course, the truck may be shaped to suit any particular installation. In such cases the present roller and track arrangement may either be provided at the periphery or lower outer extremity of the sliding canopy, or in more recent improved types the canopy has been supported by guide means of the type shown at points inside of the lateral edges of the canopy. In such installations appropriate interconnecting cable systems are provided to insure positive and coordinated action between all of the supporting trucks.

Other forms and modifications of the present invention, both with respect to the details of the individual elements and their general arrangement with respect to each other, which will become apparent to those skilled in the art after reading the present description are intended to fall within the scope and spirit of the present invention as more particularly set forth in the appended claims.

I claim:

1. In aircraft canopy construction; a longitudinal track fixedly attached to an aircraft body; said track having a substantial C shape cross-section with circular end portions, a flat intermediate portion, and an open upwardly directed longitudinal slot opposite said flat portion; the improvement of a movable truck adapted to be fixedly attached to a sliding aircraft canopy and comprising a plate element adapted to extend downwardly into a tubular track through the open longitudinal slot therein and a pair of part-spherical rollers of substantial D shape cross-section, each said roller being substantially greater than one-half of a sphere with the flattened portion of each disposed toward said plate element and one of said rollers disposed on each side of said plate element upon a transverse axis, the centers of said part-spherical rollers being spaced apart laterally a distance greater than the radius dimension of one of said rollers; a transversely disposed pin carried within an aperture of said plate element; and flanged thrust bushings disposed between the flattened faces of said rollers and the said plate support element with the cylindrical portions of said bushings engaging said transversely disposed pin and transverse apertures extending partially into each said roller, the outside dimensions of said rollers being such that the truck is adapted to slide freely along said body-attached track in a substantial single point contact of each roller without binding or jamming when subjected to vertical, lateral or rotative forces with respect to the longitudinal axis of said track.

2. In a roller and track construction for a sliding aircraft canopy including a relatively fixed longitudinally extending hollow track having in cross-section semi-cylindrical side portions interconnected on its bottom by a flat straight portion, the said hollow track having a longitudinal slot at its top portion between the opposed edges of said semi-cylindrical side portions, the improvement of a pair of apertured rollers of D shape in cross-section each roller being greater than a semi-sphere arranged to fit within the semi-cylindrical side portions of said track upon a transverse axis with a predetermined clearance therein, said rollers being disposed in a back-to-back relationship with their centers and flat back portions laterally spaced apart; the edges of said rollers formed by the intersection of said flat back with said spherical surface being obtuse angled and disposed within the center portion of said track between said straight bottom and slotted top portions, a truck element adapted to extend downwardly into the said longitudinal slot of said track and extending between the flat back portions of said rollers, a transverse pin carried by said truck element and flanged bushings carried upon said pin having a cylindrical bushing portion between said pin and each said roller with the flanged portions of said bushings disposed between said truck element and each said roller back arranged to provide for freely rotative non-binding rectilinear movements of said rollers upon engagement with the interior of said track and to thereby provide thrust means for the absorption of eccentric and lateral loads with a virtual single point of contact of said rollers with the interior of said track portion.

3. In a roller and track construction for a sliding aircraft canopy; a longitudinally extending hollow track adapted to be fixed to an aircraft body, a pair of rectilinearly movable apertured rollers of D shape in cross-section each being greater than a semi-sphere and fitting within said track upon a transverse axis with a predetermined minimum all around clearance therein, said rollers being disposed in a back-to-back relationship with their centers and flat back portions laterally spaced apart, the edges of said rollers formed by the intersection of said flat back with said spherical roller surface being obtuse angled, said longitudinally extending hollow track having semi-cylindrical side portions in cross-section interconnected on its bottom portion by a flat straight portion, the said hollow track having a longitudinal slot at its top portion between the opposed edges of said semi-cylindrical side portions, a truck element adapted to carry a sliding aircraft canopy and extending into the said longitudinal slot of said track between the flat back portions of said rollers, a transverse pin carried by said truck element, and flanged bushings carried upon said pin having a bushing portion between said pin and each said roller with the flanged portions of said bushings disposed between said truck element and each said roller back arranged to provide for freely rotative non-binding rectilinear movement of said rollers within the interior of said track and to thereby provide thrust means for the absorption of eccentric and lateral loads with a virtual single point contact of each said roller with the interior of its respective track portion.

4. In a non-binding roller and track construction for a sliding aircraft canopy including a longitudinally extending tubular track having in cross-section circular end sections, a straight interconnecting portion and a longitudinal slot opposite said straight portion; the improvement of a pair of apertured rollers of generally spherical shape appreciably greater than a semi-sphere adapted to fit within said tubular track with a predetermined minimum clearance, said rollers being laterally spaced with their centers at least a distance equal to the radius of one roller apart, an apertured element adapted to support a sliding aircraft canopy and adapted to extend into said longitudinal track slot, a transverse pin carried within the aperture of said supporting element, the said roller apertures extending partially through said roller for pivotal engagement by said transverse pin, and flanged bushings disposed between said supporting element and each said roller having portions surrounding those portions of the pin which extend within the roller apertures, each of said rollers adapted to have a virtual single point contact with its respective track portion in such a manner that said supporting element and said rollers are confined to movement in a rectilinear path along said track and are prevented by said track from vertical or transverse movement, or rotary motion, with respect to the longitudinal axis of said track.

5. In a roller and track construction for a sliding internally-pressurized aircraft canopy subjected to upward, downward and lateral forces including a relatively fixed longitudinally extending hollow track having in cross-section semi-cylindrical side portions interconnected on its bottom by a flat straight portion, the said hollow track having a longitudinal slot at its top portion, between the opposed edges of said semi-cylindrical side portions, the improvement of a pair of apertured rollers of segmental shape in cross-section, each roller being substantially greater than a semi-sphere arranged to fit within the semi-cylindrical side portions of said track upon a transverse axis with a predetermined clearance of said rollers within said track, said rollers being disposed in a back-to-back relationship with their centers and flat back portions laterally spaced apart, the lateral dimension of each said roller being not less than two thirds of its spherical diameter such that the edges of said rollers, formed by the intersection of said flat back with said spherical surface, are obtuse angled such that only well rounded portions of said rollers are addressed toward said track, a truck element adapted to carry a sliding aircraft canopy and adapted to extend downwardly into the said longitudinal slot of said track between the flat back portions of said rollers, a transverse pin carried by said truck element and flanged bushings carried upon said pin having a cylindrical bushing portion between said pin and each said roller with the flanged portions of said bushings disposed between said truck element and each said roller back arranged to provide for freely rotative non-binding rectilinear movements of said rollers upon engagement with the interior of said track and to thereby provide thrust means for the absorption of eccentric and lateral loads with a virtual single point of contact of each of said rollers with the interior of said track portion.

6. In a roller and track construction for a sliding internally-pressurized aircraft canopy subjected to upward, downward and lateral forces; a longitudinally extending hollow track adapted to be fixed to an aircraft body; a pair of rectilinearly movable apertured rollers of substantial D shape in cross-section, each said roller being greater than a semi-sphere and fitting within said track upon a transverse axis with a predetermined minimum all around clearance therein, said rollers being disposed in a back-to-back relationship with their centers and plane back portions laterally spaced apart, the edges of said rollers formed by the intersection of said flat back with said spherical roller surface being obtuse angled with rounded surfaces addressed toward said track, said longitudinally extending hollow track having semi-cylindrical side portions in cross-section inter-connected on its bottom portion by a flat straight portion, the said hollow track having a longitudinal slot at its top portion between the opposed edges of said semi-cylindrical side portions, a truck element adapted to carry a sliding aircraft canopy and extending into the said longitudinal slots of said track between the flat back portions of said rollers, a transverse pin carried by said truck element, and flanged bushings carried upon said pin having a bushing portion between said pin and each said roller with the flanged portions of said bushings disposed between said truck element and each said roller back, the said minimum clearance and the relative relationship of said rollers within said track arranged to provide for freely rotative non-binding rectilinear movement of said rollers within the interior of said track and to thereby provide thrust means for the absorption of eccentric and lateral loads with a virtual single point contact of each said roller with the interior of its respective track portion.

7. In a non-binding roller and track construction for a sliding internally-pressurized aircraft canopy subjected to upward, downward and lateral forces including a longitudinally extending tubular track having in cross-section circular end sections, a straight interconnecting portion and a longitudinal slot opposite said straight portion; the improvement of a pair of apertured rollers of generally spherical shape appreciably greater than a semi-sphere adapted to fit within said tubular track with a predetermined minimum clearance, said rollers being laterally spaced with their centers at least a distance equal to the radius of one roller apart, an apertured element adapted to support a sliding aircraft canopy and adapted to extend into said longitudinal track slot, a transverse pin carried within the aperture of said supporting element, the said roller apertures extending partially through said roller for pivotal engagement by said transverse pin, and flanged bushings disposed between said supporting element and each said roller having portions surrounding those portions of the pin which extend within the roller apertures, each of said rollers adapted to have a virtual single point contact with its respective track portion in such a manner that said supporting element and said rollers are confined to movement in a rectilinear path along said track and are prevented by said track from vertical or transverse movement, or rotary motion, with respect to the longitudinal axis of said track, and any forces tending to produce such movements or motion result in a non-binding single-point contact of either or both rollers with its respective track portion.

NORMAN F. SVENDSEN.

REFERENCES CITED

The following references are of record in the file of this patent:

UNITED STATES PATENTS

| Number | Name | Date |
|---|---|---|
| 195,148 | McQuatters | Sept. 11, 1877 |
| 523,801 | Vegiard | July 31, 1894 |
| 713,996 | Krygoski et al. | Nov. 18, 1902 |
| 1,031,677 | Rumsey | July 2, 1912 |
| 1,051,426 | Matheson | Jan. 28, 1913 |
| 1,703,622 | Hennessey, Jr. | Feb. 26, 1929 |
| 1,996,310 | Skoogh | Apr. 2, 1935 |
| 2,424,245 | Martin | July 22, 1947 |